United States Patent [19]

Cherdron et al.

[11] Patent Number: 5,504,182
[45] Date of Patent: Apr. 2, 1996

[54] THERMOPLASTICALLY PROCESSABLE AROMATIC POLYETHER AMIDE

[75] Inventors: Harald Cherdron, Wiesbaden; Willi Kreuder; Arnold Schneller, both of Mainz; Otto Herrmann-Schönherr, Bensheim, all of Germany

[73] Assignee: Hoechst Aktiengesellschaft, Frankfurt am Main, Germany

[21] Appl. No.: 50,120

[22] PCT Filed: Nov. 16, 1991

[86] PCT No.: PCT/EP91/02112

§ 371 Date: Apr. 30, 1993

§ 102(e) Date: Apr. 30, 1993

[87] PCT Pub. No.: WO92/09648

PCT Pub. Date: Jun. 11, 1992

[30] Foreign Application Priority Data

Dec. 1, 1990 [DE] Germany .......................... 40 38 393.8

[51] Int. Cl.$^6$ .......................... C08G 63/00; C08G 75/00
[52] U.S. Cl. .......................... 528/183; 528/125; 528/126; 528/172; 528/173; 528/179; 528/185; 528/192; 528/336; 528/337; 528/341; 528/345; 528/348
[58] Field of Search .......................... 528/185, 179, 528/125, 126, 172, 173, 183, 192, 337, 348, 336, 341, 345

[56] References Cited

U.S. PATENT DOCUMENTS

| | | |
|---|---|---|
| 3,063,966 | 11/1962 | Kwolek et al. . |
| 3,505,288 | 4/1970 | Bodesheim et al. . |
| 3,671,542 | 6/1972 | Kwolek et al. . |
| 4,029,835 | 6/1977 | Iwata et al. . |
| 4,278,786 | 7/1981 | Nanaumi et al. .......................... 528/179 |
| 4,410,684 | 10/1983 | Nelb et al. .......................... 528/185 |
| 4,966,955 | 10/1990 | Cherdron et al. .......................... 528/183 |
| 4,977,232 | 12/1990 | Maruyama et al. .......................... 528/185 |
| 5,039,779 | 8/1991 | Cherdron et al. .......................... 528/185 |

FOREIGN PATENT DOCUMENTS

| | | |
|---|---|---|
| 0117924 | 9/1984 | European Pat. Off. . |
| 0099997 | 4/1987 | European Pat. Off. . |
| 0263593 | 4/1988 | European Pat. Off. . |
| 0344594 | 12/1989 | European Pat. Off. . |
| 0344593 | 12/1989 | European Pat. Off. . |
| 0366316 | 5/1990 | European Pat. Off. . |
| 01595681 | 1/1970 | Germany . |
| 02600209 | 7/1976 | Germany . |
| 02636379 | 3/1977 | Germany . |
| 3818208 | 11/1989 | Germany . |
| 1246168 | 9/1971 | United Kingdom . |

OTHER PUBLICATIONS

Sample Journal, The Impurities in Kevlar 49 Fibres, Sep./Oct. 1985, pp. 17–20.
Encyl. Polym. Sci, Polyamides Aromatic, 1986, vol. 11, pp. 381–409.
Polym. Sci. USSR, Synthesis and properties of polyamides based on derivatives of bis–(p–aminophenyl)methane, Jun. 1977, vol. 19, pp. 263–269.

Primary Examiner—P. Hampton-Hightower
Attorney, Agent, or Firm—Curtis, Morris & Safford

[57] ABSTRACT

Thermoplastically processable aromatic polyether amide

Thermoplastically processable aromatic polyether amide of the formula (I)

$$R-\left(\left[NH-Ar'-NH\right]_{\overline{x}}-\left[\overset{O}{\overset{\|}{C}}-Ar-\overset{O}{\overset{\|}{C}}\right]_{\overline{y}}\right.$$
$$\left.-\left[NH-Ar_1-O-Ar_2-Y-Ar_2-O-Ar_1-NH\right]_{\overline{z}}\right)-R' \quad (I)$$

in which the symbols Ar, Ar', $Ar_1$, $Ar_2$, R, R', Y, x, y and z have the following meanings:

Ar is a divalent, substituted or unsubstituted, aromatic or heteroaromatic radical or a group —Ar*—Q—Ar*— in which

Q is a bond or an —O—, —C(CH$_3$)$_2$, —CO—, —S—, —SO— or —SO$_2$— bridge and Ar* is an aromatic radical. The carbonyl groups of the Ar radical are on non-adjacent ring carbon atoms.

A is up to three different radicals.

Ar' has the meaning given for Ar or is an Ar—Z—Ar group.

In this case, Z is a —C(CH$_3$)$_2$— or —O—Ar*—O— bridge.

Y is a —C(CH$_3$)$_2$—, —SO$_2$—, —S— or a —C(CF$_3$)$_2$— bridge and has up to two different meanings in the same polymer.

$Ar_1$ and $Ar_2$ are identical or different from one another and are each a substituted or unsubstituted para- or meta-arylene radical. The sum of the mole fractions x, y and z is one. The sum of x and z may not be equal to y and x can assume the value zero. In a preferred embodiment, z is greater than x.

20 Claims, 4 Drawing Sheets

THERMOPLASTICALLY PROCESSABLE AROMATIC POLYETHER AMIDE

BACKGROUND OF THE INVENTION

Thermoplastically processable aromatic polyether amide

The invention relates to thermoplastically processable aromatic polyether amides laving a high heat distortion point, their preparation via solution or melt condensation, and their use for the production of shaped articles, filaments, fibers, films and coatings.

Aromatic polyamides are a known class of high performance polymers (Coprehensive Polymer Sci. Vol. 5, page 375 (1989), Encyclopedia of Polymer Science Vol. 11, page 381 (1986); U.S. Pat. Nos. 3,063,966; 3,671,542 and GB 1,246,168).

Aromatic polyamides are generally highly crystalline polymers which often cannot be melted without decomposition and which lave high glass transition temperatures. They have excellent mechanical, thermal and chemical properties. The aromatic polyamide of terephthalic acid and p-phenylenediamine (formula 1)

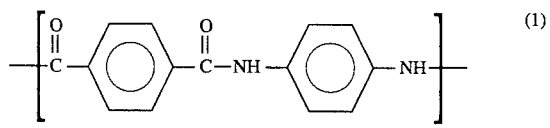

(1)

thus has very good mechanical properties and is comparable to steel on a weight basis.

However, an essential disadvantage of these materials is that they are very difficult and expensive to process. Because of the high crystallinity, the melting point (about 550° C.) is far above the decomposition temperature (about 350° C.), so that thermoplastic processing by standard techniques such as extrusion or injection molding is not possible.

The only possible method is therefore processing to give fibers or films from solution. Aggressive media, such as concentrated sulfuric acid, chlorosulfonic acid or nitrogen-containing solvents, such as N-methylpyrrolidone or dimethylacetamide with considerable additions of salts (up to 6% by weight) are often the only media which can be used for this purpose (DE-A-22 19 703). The content of inorganic concomitant substances, determined by ash analysis, is typically several thousand ppm in this process (C. O. Pruneda, R. J. Morgan, R. Lim, J. Gregory, J. W. Fischer, "The Impurities in Kevlar 49 Fibers", SAMPE Journal, Sept./Oct. 1985, 17).

A better solubility can be achieved by incorporation of meta-linkages, for example by reaction of isophthaloyl chloride with m-phenylenediamine (U.S. Pat. No. 3,063,966). Although these polyamides (formula 2)

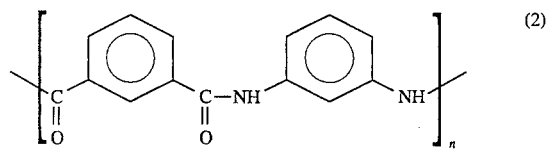

(2)

have a better solubility, they cannot be processed thermoplastically.

Thermoplastic processing is an essential prerequisite for wide use as a polymeric material.

In DSC (differential scanning calorimetry), amorphous polymers exhibit a glass transition temperature which indicates the start of cooperative chain mobility. Just above the glass transition temperature, however, the viscosity of the melt is so high (>10 000 Pa.s), that processing by injection molding or extrusion is not possible. Only as the temperature increases further does the melt viscosity fall to the values necessary for this processing. The processing range for amorphous polymers is typically at least 100° C. above the glass transition temperature, for example polyether sulfone having a glass transition temperature of 225° C. is processed by injection molding at 340°–360° C.

Partly crystalline polymers exhibit a melting peak in DSC, in addition to a glass transition point. Processing via the melt is therefore possible only above the melting point. The processing temperatures are typically about 10°–50° C. above the melting point.

The desired decrease in melt viscosity can be achieved—above all in the case of amorphous polymers—by increasing the temperature. However, this is counteracted by the limited thermal stability of the polymers. Although polymers can often be converted into the liquid state by increasing the temperature, processing from the melt is thus not always implicitly associated with this. For processing via injection molding or extrusion under the usual conditions in practice, it is necessary for the material to undergo practically no change in melt viscosity, for example by degradation or crosslinking, over a prolonged period of time at the processing temperature.

There has been no lack of attempts to prepare fusible polyamides which have high glass transition temperatures and good mechanical properties (high elasticity too dull, good tear and penetration strengths) and which furthermore allow thermoplastic processing by the standard techniques.

Aromatic polyamides which have flexibilizing ether groupings in the diamine portion, are capable of flow and can be shaped in the melt are described in DE-A-26 36 379 (U.S. Pat. No. 4,278,786). The flowability of an aromatic polyamide of isophthaloyl dichloride, terephthaloyl chloride and 2,2-bis[4-(4-aminophenoxy)phenyl]propane, which has a reduced viscosity of 0.81 dl/g, is thus $5.6 \times 10^{-3}$ cm$^3$/s at temperatures in the range from 250° to 300° C. under a load of 300 kg. However, processing of these polymers with the aid of injection molding or extrusion techniques at such low flowabilities cannot take place.

Structural variations (incorporation of meta-linkages) lead to no increase in flowability (DE-A-26 36 379, Examples 2, 3, 4, 5; Comparison Example E of this application). Interface condensation for the preparation of such polyamides leads, by partial hydrolysis, to carboxyl and amino groups which are located on the ends of the polymer chain and are reactive in the melt.

Aromatic polyamides and polyacrylates which can be processed from the melt are described in EP-A-263 593.5-tert-Butylisophthalic acid is employed as the acid component. The disadvantage of the materials described here lies mainly in their inadequate heat resistance, since the aliphatic side chain tends to undergo side reactions at higher temperatures, leading to a drastic change in melt viscosity.

Thermoplastically processable aromatic polyether amides which, for example, can be pressed or ram-extruded to give sheets are furthermore known (DE-A-38 18 208 (U.S. Ser. No. 357 527) and DE-A-38 18 209 (U.S. Ser. No. 358 180)). Solution condensation of the aromatic dicarboxylic acid chloride with the aromatic diamine is carried out using equimolar amounts in aprotic, polar solvents of the amide type. Chain-blocking agents, for example monofunctional amines or benzoyl chloride, are already added during the polymerization operation, i.e. in the presence of the diacid chloride, to limit the molecular weight.

Premature ending of the polymerization operation occurs in this manner, only half of the end groups reacting with the chain-blocking agent and the other half remaining reactive. A comparable effect occurs if one or two different chain-blocking reagents are added after the maximum possible molecular weight which can be achieved experimentally has been reached (Comparison Example C of this application).

The intrinsic viscosities of these polymers lie in a range from 1.5 to 4 dl/g, which corresponds to melt viscosities of more than 10 000 Pa.s, at below the decomposition temperature. Here also, processing by injection molding or extrusion is therefore not possible (see Comparison Example B of this application).

The invention is based on the object of developing thermoplastic aromatic polyether amides which can be processed by injection molding or extrusion processes and have good mechanical properties.

The aim of the present invention is therefore to provide, from favorable starting components, aromatic polyamides which have a high glass transition temperature and excellent mechanical properties and can be processed thermoplastically, with the proviso that the aromatic polyamides form stable melts, have melt viscosities of less than 10 000 Pa.s at below the decomposition temperature and can be processed by injection molding or extrusion.

Another aim of the present invention is to provide a process for the preparation of aromatic polyamides which leads to products having a reproducible molecular weight and stable melt viscosity properties.

Another aim of the present invention is to provide a process for shaping filaments, fibers, films and moldings by thermoplastic processes, preferably injection molding or extrusion.

SUMMARY OF THE INVENTION

The invention relates to a thermoplastically processable aromatic polyether amide of the formula (I)

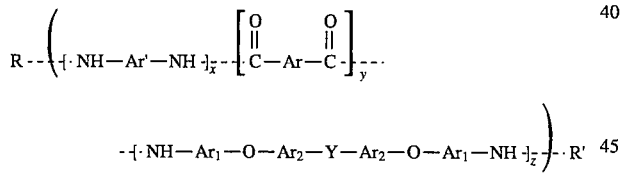

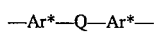

in which the symbols Ar, Ar', $Ar_1$, $Ar_2$, R, R', Y, x, y and z have the following meanings:

Ar is a divalent, substituted or unsubstituted, aromatic or heteroaromatic radical or a group —Ar*—Q—Ar*— in which

Q is a bond or an —O—, —C(CH$_3$)$_2$, —CO—, —S—, —SO— or —SO$_2$— bridge and Ar* is an aromatic radical; the carbonyl groups of the Ar radical are on non-adjacent ring carbon atoms (for example in the para- or meta-position). This is optionally substituted by one or two branched or unbranched C$_1$–C$_3$-alkyl or alkoxy radicals, aryl or aryloxy radicals or C$_1$–C$_6$-perfluoroalkyl or perfluoroalkoxy radicals or by fluorine, chlorine, bromine or iodine atoms, Ar being up to three different radicals;

Ar and Ar' are independent of one another and are identical or different, and Ar' has the meaning given for Ar or is an Ar—Z—Ar group. In this case, Z is a —C(CH$_3$)$_2$— or —O—Ar*—O—bridge.

Y is a —C(CH$_3$)$_2$—, —CO—, —SO$_2$—, —S— or a —C(CF$_3$)$_2$—bridge, Y in the same polymer laving up to two different meanings at the same time;

$Ar_1$ and $Ar_2$ are identical or different from one another and are each a substituted or unsubstituted para- or meta-arylene radical, for example meta- or para-phenylene, $Ar_2$ preferably being a para-phenylene radical.

The sum of the mole fractions (molar contents) x, y and z is one, but the sum of x and z may not be equal to y, and x can assume the value zero. In a preferred embodiment, z is greater than x. The molecular weight is controlled by non-stoichiometric addition of the monomers.

After the conclusion of the polycondensation reaction, the ends of the polymer chain are closed completely by addition of at least stoichiometric amounts of monofunctional reagents which react in the polymer to give groups R and R' which do not react further. The end groups R and R' here are independent of one another and are identical or different, preferably identical, and are chosen from a group comprising the formulae V, VI, VII and/or VIII.

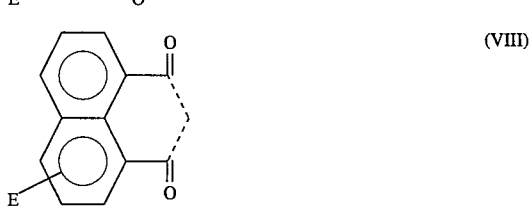

In the case of the end groups VII and/or VIII, the terminal nitrogen in formula (I) is an imide nitrogen.

E in the abovementioned formulae is a hydrogen or a halogen atom, in particular a chlorine, bromine or fluorine atom, or an organic radical, for example an aryl(oxy) group.

The aromatic polyether amide according to the invention, in which the structure comprises the recurring units

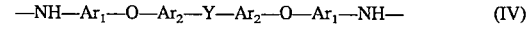

in which Ar, Ar', $Ar_1$, $Ar_2$ and Y have the abovementioned meaning, is prepared by reaction of one or more dicarboxylic acid derivatives with one or more diamines by the solution or melt condensation process, one of the components being employed in less than the stoichiometric amount and a chain-blocking agent being added when the polycondensation has ended. In a preferred case, in each case up to three different units of the formulae (II), (III) and/or (IV) are employed for the preparation of the polyether amides according to the invention. It has been found that thermoplastic aromatic polyether amides which have very good mechanical properties can be processed by conventional processes, such as, for example, extrusion or injection molding, if a) the molecular weight is controlled in a targeted manner by using non-stoichiometric amounts of the monomers, b) the ends of the polymer chain are closed completely by monofunctional compounds which do not react further in the polymer, and, preferably, c) the content of inorganic impurities in the polymer after working up and isolation does not exceed 500 ppm.

The thermoplastic aromatic polyamides prepared by the process according to the invention furthermore are distinguished by the fact that they have an average molecular weight $M_n$ in the range from 5,000 to 50,000 ($M_n$= absolute number average) and a low melt viscosity which does not exceed 10 000 Pa.s at the processing temperature.

Processing to give moldings, films and wires or else to give coatings is carried out from a solution or melt, which have been prepared by the customary polycondensation processes, but preferably by melt or solution polycondensation.

DESCRIPTION OF THE PREFERRED EMBODIMENTS

The following compounds are suitable for preparation of the polyether amides according to the invention:

Dicarboxylic acid derivatives of the formula (IX)

$$W—CO—Ar—CO—W \quad (IX)$$

in which Ar has the abovementioned meaning and W is a fluorine, chlorine, bromine or iodine atom, preferably a chlorine atom, or an —OH or OR" group, film which R" is a branched or unbranched aliphatic or aromatic radical.

Examples of compounds of the formula (IX) are: terephthalic acid terephthaloyl dichloride phenyl terephthalate isophthalic acid diphenyl isophthalate isophthaloyl chloride phenoxyterephthalic acid phenoxyterephthaloyl dichloride diphenyl phenoxyterephthalate bis(n-hexyloxy)terephthalic acid bis(n-hexyloxy)terephthaloyl dichloride diphenyl bis(n-hexyloxy)terephthalate 2,5-furandicarboxylic acid 2,5-furandicarbonyl chloride diphenyl 2,5-furandicarboxylate and correspondingly also the dicarboxylic acid dichlorides and diphenyl esters of thiopheneticarboxylic acid naphthalene-2,6-dicarboxylic acid diphenyl ether-4,4'-dicarboxylic acid benzophenone-4,4'-dicarboxylic acid isopropylidene-4,4'-dibenzoic acid diphenyl sulfone-4,4'-dicarboxylic acid tetraphenylthiophene-dicarboxylic acid diphenyl sulfoxide-4,4'-dicarboxylic acid diphenyl thioether-4,4'-dicarboxylic acid and trimethylphenylindanedicarboxylic acid.

Suitable aromatic diamines of the formula (X)

$$H_2N—Ar'—NH_2 \quad (X)$$

in which Ar'— has the abovementioned meaning, are preferably the following compounds: m-phenylenediamine p-phenylenediamine 2,4-dichloro-p-phenylenediamine diaminopyridine bis(aminophenoxy)benzene 1,4-bis(4-aminophenoxy)benzene 1,3-bis(4-aminophenoxy)benzene 1,4-bis(3-aminophenoxy)benzene 1,3-bis(3-aminophenoxy)benzene 1,2-bis(4-aminophenoxy)benzene 1,2-bis(3-aminophenoxy)benzene 2,6-bis(aminophenoxy)pyridine 3,3'-dimethylbenzidine 4,4'- and 3,4'-diminodiphenyl ether isopropylidene-4,4'-dianiline p,p'- and m,m'-bis(4-aminophenylisopropylidene)benzene 4,4'- and 3,3'-diaminobenzophenone 4,4'- and 3,3'-diaminodiphenyl sulfone and bis(2-amino-3-methylbenzo) thiophene S,S-dioxide.

Possible aromatic diamines are furthermore those of the formula (XI)

$$H_2N—Ar_1—O—Ar_2—Y—Ar_2—O—Ar_1—NH_2 \quad (XI)$$

in which $Ar_1$, $Ar_2$ and Y have the abovementioned meaning.

Possible aromatic diamines of the formula (XI) are: 2,2-bis[4-(3-trifluoromethyl-4-aminophenoxy)phenyl] propane bis[4-(4-aminophenoxy)phenyl[sulfide bis[4-(3-aminophenoxy)phenyl]sulfide bis[4-(3-aminophenoxy)phenyl]sulfone bis[4-(4-aminophenoxy)phenyl]sulfone 2,2-bis [4-(4-aminophenoxy)phenyl]propane 2,2-bis[4-(3-aminophenoxy)phenyl]propane 2,2-bis[4-(2-aminophenoxy)phenyl]propane 1,1,1,3,3,3-hexafluoro-2,2-bis[4-(4-aminophenoxy)phenyl]propane.

The polyether amides according to the invention are preferably prepared by solution condensation processes.

Solution condensation of the aromatic dicarboxylic acid dichloride with the aromatic diamines is carried out in aprotic, polar solvents of the amide type, for example N,N-dimethyl-acetamide, preferably in N-methyl-2-pyrrolidone. If appropriate, halide salts of metals of the first and/or second group of the Periodic Table of the Elements are added to these solvents in a known manner in order to increase the dissolving capacity or to stabilize the polyether amide solutions. Preferred additions are calcium chloride and/or lithium chloride. In a preferred embodiment, the condensation is carried out without addition of a salt, since the aromatic polyamide described above are distinguished by a high solubility in the abovementioned solvents of the amide type.

In contrast to the polyamide structures known to date, it has been found in the case of the polyamides according to the invention that fusible polyether amides which have good mechanical properties, are distinguished in particular by high initial moduli and good tear and penetration strengths and allow thermoplastic processing by standard methods can be prepared if at least one of the starting components is employed in less than the stoichiometric amount. In this way, it is possible to achieve a limitation of the molecular weight in accordance with the known Carother's equation:

$$\overline{P}_n = \frac{1+q}{1-q}$$

in which q≠1 and at the same time $$q = \frac{y}{x+z}.$$

$P_n$=degree of polymerization q=molar ratio of the diacid components to the amine components.

If less than tile stoichiometric amount of acid dichloride is used, a monofunctional aromatic acid chloride or acid anhydride is added as the chain-blocking agent at the end of the polymerization reaction, for example benzoyl chloride, fluorobenzoyl chloride, diphenylcarbonyl chloride, phenoxybenzoyl chloride, phthalic anhydride, naphthalic anhydride or 4-chloronaphthalic anhydride.

Such chain-blocking agents can be optionally substituted, for example by fluorine or chlorine atoms. Benzoyl chloride or phthalic anhydride is preferably employed, particularly preferably benzoyl chloride.

If less than the stoichiometric amount of the diamine component is used, a monofunctional, preferably aromatic amine is employed as a chain-blocking agent at the end of the polycondensation, for example fluoroaniline, chloroaniline, 4-aminodiphenylamine, aminobiphenylamine, aminodiphenyl ether, aminobenzophenone or aminoquinoline.

In a particularly preferred embodiment of the polycondensation process, the diacid chloride in less than the stoichiometric amount is subjected to polycondensation with the diamine, and the reactive amino groups which remain are then deactivated with a monofunctional acid chloride or diacid anhydride.

In another preferred embodiment, the diacid chloride is employed in less than the stoichiometric amount and is subjected to polycondensation with a diamine. The reactive amino end groups which remain are then deactivated with a monofunctional, preferably aromatic, optionally substituted acid chloride or acid anhydride.

The chain-blocking agent, that is to say monofunctional amine or acid chloride or acid anhydride, is preferably employed here in a stoichiometric amount or more than the stoichiometric amount, based on the diacid or diamine component.

The molar ratio q (acid component to diamine component) for preparation of the aromatic polyamides according to the invention can be varied in the range from 0.90 to 1.10, exact stoichiometry (q=1) of the bifunctional components being excluded. The molar ratio is particularly preferably in the range from 0.90 to 0.99 and 1.01 to 1.10, particularly preferably in the range from 0.93 to 0.98 and 1.02 to 1.07, especially in the range from 0.95 to 0.97 and 1.03 to 1.05.

The polycondensation temperatures are usually in the range from −20° to +120° C. preferably from +10° to +100° C.

Particularly good results are achieved at reaction temperatures of +10° to +80° C. The polycondensation reactions are preferably carried out such that 2 to 40, preferably 5 to 30% by weight of polycondensate are present in the solution after conclusion of the reaction. For specific uses, the solution can be diluted, if required, with N-methyl-2-pyrrolidone or other solvents, for example dimethylformamide, N,N-dimethylacetamide or butylcellosolve, or concentrated under reduced pressure (thin film evaporator).

When the polycondensation has ended, the hydrogen chloride formed, which is loosely bonded to the amide solvent, is removed by addition of acid-binding auxiliaries. Auxiliaries which are suitable for this purpose are, for example, lithium hydroxide, calcium hydroxide and, in particular, calcium oxide, propylene oxide, ethylene oxide or ammonia. In a particular embodiment, pure water, which dilutes the hydrochloric acid and at the same time serves to precipitate the polymer, is used as the "acid-binding" agent. For production of shaped structures according to the present invention, the copolyamide solutions according to the invention which are described above are filtered, degassed and further processed in the known manner described below.

If appropriate, suitable amounts of additives are also added to the solutions. Examples are light stabilizers, antioxidants, flameproofing agents, antistatics, dye-stuffs, colored pigments, fillers or polymers, such as, for example, polytetrafluoroethylene.

For isolation of the polyether amide, a precipitant can be added to the solution and the coagulated product can be filtered off. Typical precipitants are, for example, water, methanol and acetone, which may also contain pH-controlling additions, such as, for example, ammonia or acetic acid, if appropriate.

The isolation is preferably carried out by comminution of the polymer solution with an excess of water in a cutting mill. The finely comminuted coagulated polymer particles facilitate the subsequent washing steps (removal of the secondary products formed from the hydrogen chloride) and the drying of the polymer (avoidance of inclusions) after filtration. Subsequent comminution is also unnecessary, since a free-flowing product is formed directly.

In addition to the solution condensation described, which is a readily accessible process, other customary processes can also be used for the preparation of polyamides, such as, for example, melt or solids condensation, as already mentioned. In addition to condensation with regulation of the molecular weight, these processes can also comprise purification or washing steps and the addition of suitable additives. The additives moreover can also be added subsequently to the isolated polymer during thermoplastic processing.

The aromatic polyamides according to the invention have surprisingly good mechanical properties and high glass transition temperatures.

The Staudinger index $[\eta]_o$ is in the range from 0.4 to 1.5 dl/g, preferably in the range from 0.5 to 1.3 dl/g, particularly preferably in the range from 0.6 to 1.1 dl/g. The glass transition temperatures are in general above 180° C., preferably above 200° C., and the processing temperatures are in the range from 320° to 380° C., preferably in the range from 330° to 370° C., particularly preferably in the range from 340° to 360° C.

Processing of the polyphides according to the invention can be carried out by injection molding or extrusion processes, since the melt viscosities do not exceed 10 000 Pa.s at the processing temperature.

Possible suitable apparatuses are conventional injection molding machines with locking forces of 60 to 120 t and injection pressures of 1000 to 2000 bar. The extrusion can be carried out on customary single- or twin-screw extruders.

The polyether amides according to the invention are suitable for the production of a large number of moldings, such as bearing components, seals, closures, clips, electrical insulators, electrical plugs, housings for electrical components, car body components in motor vehicle construction, pistons, gearwheels, turbine blades, impeller blades, thread guides, camshafts, brake linings and clutch disks.

Threads, fibers or pulp of the copolyether amides according to the invention can be used, for example, as reinforcing materials for rubber, thermoplastics or thermo-setting resins, for the production of filter fabrics or as a lightweight insulating material. Foams of high temperature resistance can be produced by addition of gas-supplying additives.

Films and paper are suitable as heat-resistant insulating material; films in particular as a substrate for flexible printed circuit boards and for use in the data processing sector.

The polyether amides according to the invention and the moldings produced therefrom have been tested by the following test methods: Staudinger index $[\eta]_o$ The Staudinger index $[\eta]_o$ is defined according to equation 1:

$$[\eta]_o = \lim_{c_2 \cdot 0} \frac{(\eta/\eta_1) - 1}{c_2} \qquad \text{(equation 1)}$$

in which $\eta$ and $\eta_1$ are the viscosities of the solution and solvent respectively and $c_2$ is the concentration of the polymer. The measurement was carried out in N-methylpyrrolidone at 25° C.

Mechanical properties

The tear strength, elongation at tear, tensile stress at yield, elongation at yield and elasticity modulus (E modulus) were determined with the aid of tensile stress/elongation apparatuses of the Instron brand at 23° C. under 50% relative atmospheric humidity.

EXAMPLES

The following abbreviations have been used in the examples:

| | |
|---|---|
| BAB = | 2,2-bis[4-(4-aminophenoxy)phenyl]propane |
| TPC = | terephthaloyl chloride |
| IPC = | isophthaloyl chloride |
| FDC = | 2,5-furandicarbonyl chloride |
| FBC = | 4-fluorobenzoyl chloride |
| BCl = | benzoyl chloride |
| NMP = | N-methylpyrrolidone |
| CaO = | calcium oxide |
| E modulus = | elasticity modulus |
| MFI = | melt flow index |
| DSC = | differential scanning calorimetry (dynamic thermal analysis) |
| $M_w$ = | weight-average molecular weight |
| $M_n$ = | number-average molecular weight |
| $D = M_w/M_n$ = | molecular dispersity, heterogeneity, molecular weight distribution |
| TGA = | thermogravimetric analysis |
| $T_g$ = | glass transition temperature (determined as the point of inflection in the glass stage in DSC) |
| PS = | polystyrene, M(PS) = apparent molecular weight, determined by GPC in relation to polystyrene |
| PO = | 1,2-propylene oxide |
| BAPS = | bis[4-(4-aminophenoxy)phenyl] sulfone |
| GPC = | gel permeation chromatography |
| PA = | phthalic anhydride |
| E water = | deionized water |
| UL 94 = | Underwriters Laboratories (U.S.A.) Bulletin 94 (test standard for combustibility) |
| MH = | Mark-Houwink equation: $[\eta]_o = k \cdot M_w^a$ |
| $[\eta]_o$ = | Staudinger index, unit dl/g |
| $\eta_m$ = | melt viscosity, unit Pa.s |
| DMF = | dimethylformamide |
| DMAC = | N,N-dimethylacetamide |

EXAMPLE 1

Figure 1:
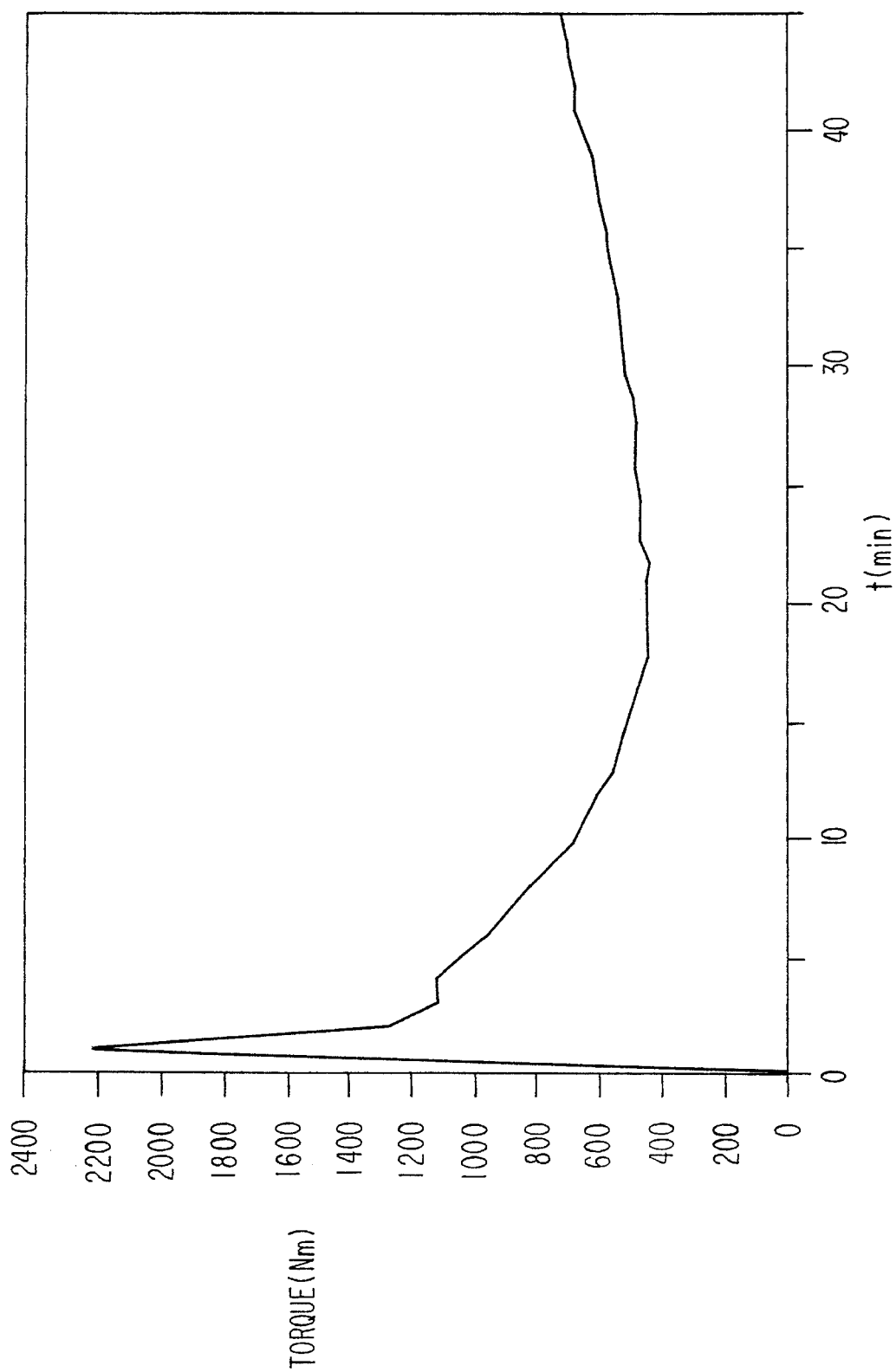
FIG. 1 is a graph of torque versus time for a polymer according to the invention.

Polyether amide from 2,2-bis[4-(4-aminophenoxy)phenyl]propane, terephthalic acid and benzoyl chloride in N-methylpyrrolidone:

4105 g (10 mol) of BAB were dissolved in 15.24 l of NMP in an enameled 40 l stirred tank with a heating jacket under nitrogen. After controlling the temperature at 25° C., 1959 g (9.65 mol=96.5%) of TPC, dissolved in 5 l of NMP, were added. 30 minutes after 70° C. was reached, 112.5 g (0.8 mol) of BCl were added, the mixture was cooled to 60° C. a further 30 minutes later, and 566 g (10.1 mol) of CaO as a suspension in 305 g of NMP were added. After 1 hour, the clear, viscous solution was drained off, diluted from 20% to approximately 13% polymer content with about 13 l of NMP and filtered under an $N_2$ pressure of 3 bar, and the product was finally precipitated as a fine powder (particle size $\leq 1$ mm) with water. The polymer powder was washed four times for in each case 2 hours with 60 l of fresh E water at 95°–98° C. in a stirred pressure filter, coarsely dried in a hot stream of nitrogen and washed twice more with 60 l of acetone (2 hours, 60° C.). It was predried overnight in a stream of nitrogen, and then thoroughly dried at 130° C. (100 mbar) for 14 hours and finally at 150° C. (<10 mbar) for 8 hours. Yield 5.0 kg (93%). $[\eta]_0$=1.06 dl/g; $M_w$=40,000 g.mol$^{-1}$; ash content: 200 ppm; GPC:$M_w$ (PS)=49,000 g.mol$^{-1}$, $M_n$ (PS)=50,000, D=2.1. The melt stability was tested in a kneading experiment (FIG. 1).

The free-flowing polymer powder was shaped to a 2 mm melt strand under an argon inert gas atmosphere in a twin-screw extruder (Haake Rheoeord System 90 with twin-screw extruder TW 100 and die diameter 1 mm) at a temperature zone setting of 310°/320°/330°/340° C., the last figure corresponding to the die temperature, and a melt temperature of 360° C., the strand being injection molded after granulation and renewed thorough drying (150° C., <10 mbar, 8 hours).

Apparatus and conditions: KRAUSS MAFFEI 90/340 A, locking force 900 kN, screw diameter 35 (20D), die temperature 350° C., mold temperature 180° C. injection pressure 1500 bar (4 seconds), after-pressure 1200 bar (12 seconds), total cycle time 35 seconds.

The following properties were measured on the resulting shaped articles:

Density: 1.22 g.cm$^{-3}$

Water uptake: 2.3% (23° C., 85% relative atmospheric humidity)

Elongation at break: 6%

Tensile E modulus: 3.4 GPa (tensile bar No. 3, DIN 53 455)

Flexural E modulus: 3.2 GPa

Notched impact strength: 83 J/m

Impact strength: 281 J/m

Ball indentation hardness: 162 Pa

MFI (340° C., 10 kg): 15 ccm/10 minutes

Tg=210° C. (DSC)

Combustibility (UL-94): V-O (0.8 mm), i.e. most favorable combustibility class, even without flameproofing additives

Comparison Example A

Polyether amide from BAB and TPC without addition of BCl:

314.1 g (0.7651 mol) of BAB were dissolved in 1,264 g of dry NMP under nitrogen. After cooling to −10° C., 155.5 g (0.7659 mol) of TPC were added, while stirring. The mixture was further stirred at −10° C. for one hour, the cooling bath was then removed and, when room temperature had been reached, the mixture was stirred for a further 3 hours. 766 g of DMF were added to the viscous polymer solution and the mixture was homogenized, while stirring. The polymer was precipitated in a precipitating bath of 5 kg of ethanol and 20 l of water, while stirring, filtered off and washed intensively several times with hot E water. The colorless polymer was dried intensively, finally at 120° C. in vacuo (<10 mbar) for 8 hours. The Staudinger index was $[\eta]_o$=2.45 dl/g$^{-1}$, corresponding to $M_w$=170,000 g.mol$^{-1}$.

GPC: $M_n$ (PS)=189,000 g/mol; D=6.1.

Figure 2:
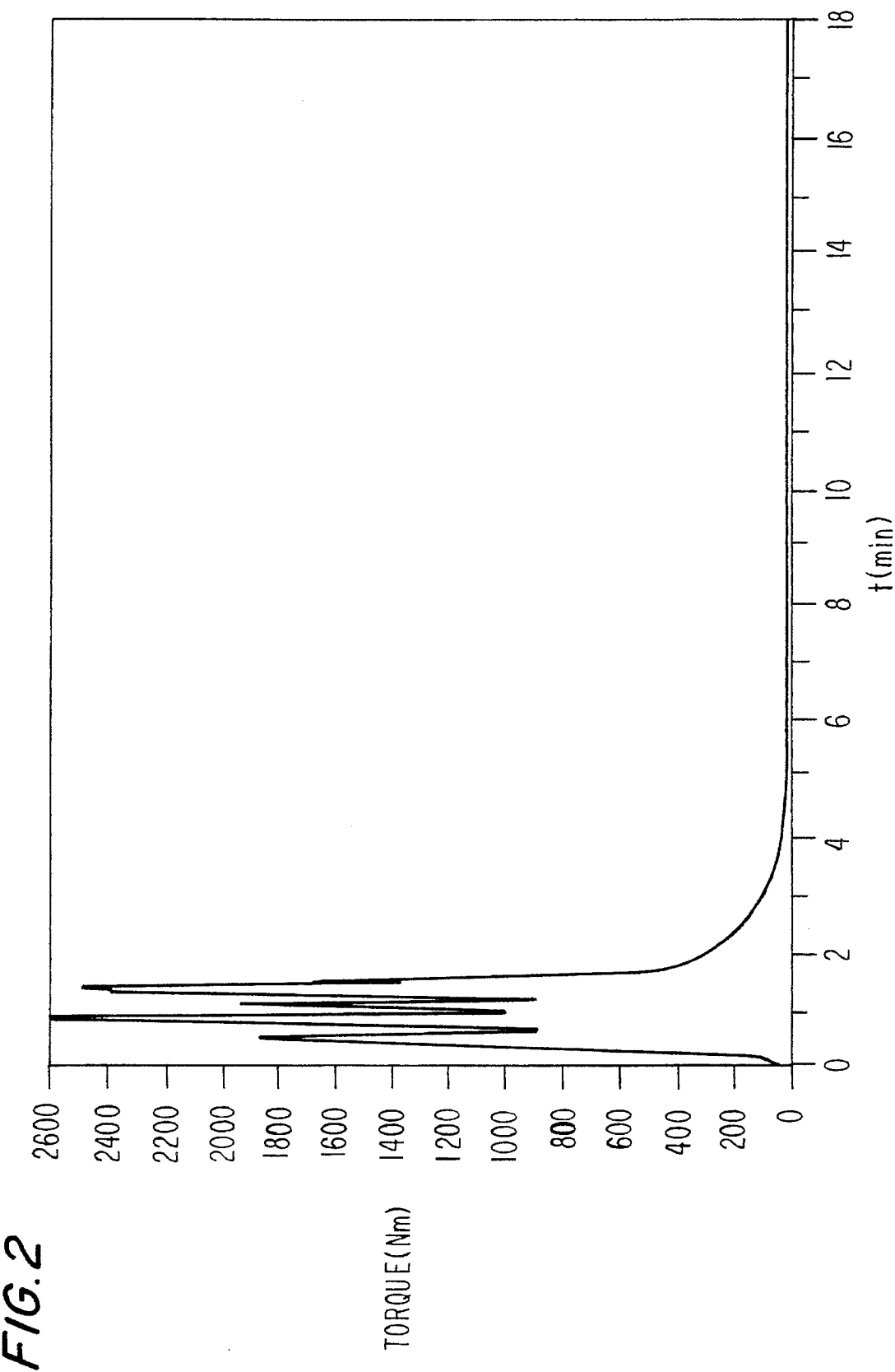
FIG. 2 is a graph of torque versus time for a comparison polymer.

Ash content=2,700 ppm 60 g were investigated in a kneading experiment under an argon inert gas atmosphere at 360° C. After 3 minutes, the torque falls to 10% of the maximum value (FIG. 2). After 6 minutes, the torque has fallen practically to zero. After 30 minutes, a black-brown, crumbly mass which showed no signs of a melting process was removed.

Comparison Example B

Polyether amide from BAB and TPC without addition of benzoyl chloride (BCl)

164.21 g (0.4 mol) of BAB were dissolved in 2,193 g of NMP under nitrogen, and 81.21 g (0.4 mol) of TPC were added at between 15° and 70° C. in the course of about 60 minutes. The viscous and clear solution was subsequently stirred at 70° C. for about a further 40 minutes, then neutralized with 24.54 g (0.438 mol, 96% pure) of CaO and subsequently stirred at 70° C. for a further 30 minutes. The solution was filtered, and coagulated and comminuted in a cutting mill (manufacturer: Condux), with addition of water. The polymer which had precipitated was washed five times with desalinated water and then twice with acetone. Drying was carried out at 130° C. in vacuo under 50–80 mbar with gentle covering with nitrogen.

Staudinger index $[\eta]_o$ 4.2 dl/g, $M_w$=400,000 g.mol$^{-1}$

Ash content: 3,200 ppm

DSC: glass transition temperature Tg=230° C.,

TGA: significant weight loss at 400° C.

In kneading experiments under an argon inert gas atmosphere at 340° C., 350° C. and 360° C., a black-brown, porous/brittle mass which showed no visible traces of a melting operation was removed in each case a few minutes after in each case 60 g had been introduced completely.

EXAMPLES 2–7

In an analogous manner to that in Example 1, 4105 g (10 mol) of BAB were reacted with 1949 g (9.6 mol=96%) of TPC or isophthaloyl chloride and 126.5 g (0.9 mol) of BCl in 20.8 kg of NMP:

| Ex. | TPC/ IPC ratio | Staudinger index $[\eta]_o$/dl/g | From GPC $M_n$ (PS) | D | $M_w$ from MH | $T_g$ [b) /°C. |
|---|---|---|---|---|---|---|
| 2 | 1/0 | 0.86 | 39,000 | 2.1 | 36,000 | 227 |
| 3 | 8/2 | 0.69 | 34,000 | 2.2 | 26,000 | 221 |
| 4 | 7/3 | 0.68 | 32,000 | 2.2 | 25,000 | 224 |
| 5 | 6/4 | 0.68 | 36,000 | 2.1 | 25,000 | 222 |
| 6 | 5/5 | 0.68 | 35,000 | 2.0 | 25,000 | 226 |
| 7[a)] | 7/3 | 0.80 | 44,000 | 2.0 | 32,000 | 227 |

[a)] Example 7 as Example 4, but TPC/BAB = 965/1000 (molar ratio)
[b)] Polymers 3–7 are amorphous in X-rays.

The products were extruded on an extruder of the Leistritz brand (Type LSM 30.34 GH) under the conditions described below (40 revolutions per minute). Injection molding as described in Example 1 resulted in the following mechanical properties:

The resistance to solvents was tested on a standard test specimen (No. 3). After storage in chloroform for days, the test specimen had taken up 5.7% by weight of the solvent. The tear stress was increased to 81 MPa, while the other mechanical properties remained unchanged.

EXAMPLE 8

Polyether amide from BAB, TPC, 4-fluorobenzoyl chloride and 1,2-propylene oxide in NMP:

246.3 g (0.6 mol) of BAB were dissolved in 1615 g of dry NMP under nitrogen. 118.16 g (0.582 mol=97%) of TPC were added at 10° C. After heating to 50° C. (about 0.5 hour), 5.7 g (36 mmol=6%) of FBC were added. 40 minutes later, a mixture of 73.2 g (1.26 mol) of PO and 88 g of NMP were added dropwise via a dropping funnel. After filtration, the product was precipitated in desalinated water (E water), and washed out several times with hot E water and then several times with acetone. After predrying under about 100 mbar, it was finally dried at 150° C. under <10 mbar for 8 hours.

Ash content: 460 ppm.

EXAMPLE 9

287.4 g (0.7 mol) of BAB were dissolved in 1708 g of dry NMP under nitrogen. 139.27 g (0.686 mol=98%) of TPC were added at 3° C. After heating to 50° C., 5.6 g (35 mmol=5%) of FBC were added. 1 hour later, a mixture of 85.4 g (1.47 mol) of PO and 88 g of NMP was added dropwise via a dropping funnel. Working up was carried out analogously to Example 8.

Ash content: 350 ppm.

EXAMPLE 10

Polyether amide from BAB, TPC, isophthaloyl chloride, FBC and PO in NMP:

410.5 g (1.0 mol) of BAB were dissolved in 1816 g of dry NMP under nitrogen. A homogeneous mixture of 99.48 g each of TPC and IPC (in each case 0.49 mol, together 0.98 mol=98%) was added at 5° C. and rinsing was carried out with 100 ml of NMP. After the internal temperature had reached 50° C. (about 0.5 hour), 6.34 g (40 mmol=4%) of FBC were added. 1 hour later, a mixture of 122 g (2.1 mol) of PO and 147 g of NMP was added dropwise. Working up was carried out analogously to Example 8.

Ash content: 100 ppm.

| Ex. | Melt temp. die/°C. | Back pressure/ bar | Through- put kg/h | MFI[a)] 340° C. 5 kg | E modulus/ GPa | Elongation at tear/% | Tear stress/ MPa | Yield Elongation/ % | Stress/ MPa | Notched impact strength/mJ |
|---|---|---|---|---|---|---|---|---|---|---|
| 2 | 336 | 45 | 1.9 | 4 | 2.6 | 6 | 87 | | | 81/J/m[b)] |
| 3 | 339 | 15 | 1.7 | 6 | 2.5 | 21 | 76 | 9 | 86 | 220 |
| 4 | 331 | 30 | 2.3 | 7 | 2.5 | | 64 | | | 210 |
| 5 | 334 | 30 | 2.4 | 8 | 2.4 | | 74 | | | 210 |
| 6 | 335 | 35 | 3.1 | 11 | 2.5 | | 78 | | | 200 |
| 7 | 335 | 30 | 2.3 | 4 | 2.5 | 27 | 75 | 8 | 89 | 200 |

[a)] Melt flow index in dg/minute
[b)] Impact strength 281 J/m

Comparison Example C shows that no end group control is possible if the end group-closing reagents are added to a polymer having the maximum molecular weight which can be achieved experimentally.

129.75 g (0.316 mol=100%) of BAB were dissolved in 2110 g of dry NMP. 60.96 g (0.300 mol=95%) of TPC were first added at 15° C. When the mixture had reached 70° C., a further 3.8 g (18.7 mol, together 100.29%) of TPC were added in portions until no further rise in the viscosity of the polymerization solution was observed. 0.95 g (6 mmol= 1.9%) of FBC was added and the mixture was subsequently stirred at 70° C. for 80 minutes. 0.67 g (6 mmol=1.9%) of 4-fluoroaniline was then added. 80 minutes later, 34.96 g (0.623 mol) of CaO were added. After 1 hour at 70° C., the mixture was filtered and the product was worked up as in Example 8.

TABLE

Examples 8–10 and Comparison Example C

| Ex. | Molar ratio q | $[\eta]_o$[a] | % F (NMR)[b] | % F (EA)[c] | Fluorine content calculated/%[d] | Ash content/ppm |
|---|---|---|---|---|---|---|
| 8 | 97 | 1.10 | 0.195 + 0.010 | 0.18 | 0.21 | 460 |
| 9 | 98 | 1.40 | 0.157 + 0.008 | 0.14 | 0.14 | 350 |
| 10 | 98 | 1.35 | 0.135 + 0.007 | 0.11 | | |
| C[e] | 100 | 3.0 | <0.01%[f] | <0.01[f] | 0.03 | |

[a] Staudinger index in dl/g
[b] Measured as 4-fluorobenzamide end group in the $^{19}$F-NMR spectrum
[c] Elemental analysis (EA)
[d] Calculated from $M_n = \frac{1+q}{1-q} \times 270 = \frac{3800}{F/\%}$ and $[\eta]_o = k \times M_w{}^a$ where $D = \frac{M_w}{M_n} = 2$
[e] Polymer decomposes to a black mass on heating
[f] Below the detection limit 79–100% of the fluorine from the 4-fluorobenzamide end groups was found in polymers 8–10 according to the invention. No fluorine was to be found in Example C, which is not according to the invention, i.e. less than 33% of the polymer end groups carried fluorine (incomplete end group closure).

EXAMPLES 11, 12, 13

This series of experiments shows that an excess of end group-closing reagent (here BCl) is harmless to the fusible polymer.

| Example | %[a] | $[\eta]_o$/dl/g | $M_n$ (PS)/gmol$^{-1}$ | D |
|---|---|---|---|---|
| 11 | 8 | 0.95 ± 0.04 | 62,000 | 1.81 |
| 12 | 9 | 0.96 ± 0.04 | 63.000 | 1.82 |
| 13 | 10 | 1.03 ± 0.05 | 61,000 | 1.83 |
| Average | / | 0.98 | 62,000 | 1.82 |

[a] Mol percent of end group-closure reagent benzoyl chloride (BCl); 7% = stoichiometric The studies showed—within the measurement accuracy—no difference between polymers 11, 12 and 13. The samples also behaved comparably in the measurement kneader at 340° C.

EXAMPLE 11

410.5 g (1.0 mol=100%) of BAB were initially introduced into 2009 g of dry NMP under nitrogen, and 195.91 g (0.965 mol=96.5%) of TPC were added. The mixture was heated first to 50° C. and then to 70° C. (about 0.5 hour). After addition of 11.24 g (0.08 mol=8%) of BCl, stirring was continued at 70° C. for 30 minutes, and a liquid mixture of 128 g of PO and 154 g of NMP was finally added dropwise. Working up was carried out as described in Example 8.

Ash content: 98 ppm

EXAMPLE 12

Procedure as in Example 11; however, instead of 8% of BCl, 9%=0.09 mol=12.65 g of BCl was added here.

EXAMPLE 13

Procedure as in Example 11; however, instead of 8% of BCl, 10%=0.1 mol=14.57 g of BCl were added here. Ash content: 59 ppm

EXAMPLE 14

Polyether sulfone-amide from bis[4-(4-aminophenoxy)phenyl] sulfone, TPC, IPC and BCl in NMP:

As Example 1, but with the following starting substances: 3676 g (8.5 mol) of BAPS (purity 98.6%) in each case 828.3 g (4.08 mol) of IPC and TPC (8.16 mol=96%) 106.8 g (0.76 mol=9%) of BCl and 518 g (9.24 mol) of CaO in a total of 18,270 g of NMP instead of acetone, which acts as a plasticizer, methanol was used for rinsing.

Staudinger index: $[\eta]_o$=0.81 dl/g

GPC: $M_n$ (PS)=56,000 g/mol; $D=M_w/M_n$=2.2

Comparison Example D shows the adverse influence of ionic impurities on fusibility.

A mixture of the stable acetylacetonates of the following ions were added to a polymer prepared according to Example 11, which had an ash content of <500 ppm and showed no drastic change within 30 minutes in a kneading test at 340° C. under an inert gas, such that the following impurity concentrations in ppm resulted in the polymer: 330 Fe, 130 Cr, 130 Ni, 10 Mo, 10 Mn, 10 Cu, 10 Co, 10 V.

A glossy black decomposed mass was obtained within a few minutes in the kneading experiment at 340° C. and could no longer be dissolved completely in NMP.

EXAMPLES 15 AND 16

Two polymer batches, prepared according to Example 8 but with 96% of TPC, were extruded under argon under otherwise identical conditions.

| | | | Staudinger index/dl/g | | |
|---|---|---|---|---|---|
| Ex. | Heating zones[a] °C. | $T_{melt}$/°C. | before extrusion | after extrusion | extruded after a standing time of 20 mins. |
| 15 | 310/320/330/340 | 360 | 0.83 | 0.58 | 0.60 |
| 16 | 330/340/350/360 | 380 | 0.74 | 0.66 | 0.57 |

[a] The last entry indicates the particular die temperature.

All the extruded samples—including those which had additionally stood in the extruder at temperatures of 360° to 380° C. for 20 minutes—show a yellow-brown coloration. The specimen strands of about 2 mm thickness are mechanically strong, i.e. they can be broken manually only with effort—preferentially at gas inclusions.

EXAMPLE 17

Phthalic anhydride as chain-blocking agent
Polyether aramide from BAB, TPC and phthalic anhydride and PO in NMP:

410.5 g (1.0 mol=100%) of BAB were initially introduced into 2020 g of dry NMP at 3° C. under nitrogen, and 196.93 g (0.97 mol=97%) of TPC were added. The mixture was then heated to 50° C., while stirring was continued, and 8.89 g (0.06 mol=6%) of PA were added. 1 hour later, a mixture of 118 g of PO and 143 g of NMP was added dropwise. After working up as described in Example 8 and additional drying at 200° C. (3 hours), 505 g (93%) of a colorless polymer powder which had the following properties were obtained:

Staudinger index: $[\eta]_o = 1.1$ dl/g
GPC: $M_n$ (PS)=66,000 g/mol; $D=M_w/M_n=2.4$ The 300 MHz $^1$H-NMR spectrum and the corresponding $^{13}$C-NMR spectrum (solvent DMSO-$d_6$) had the following signals characteristic of the phthalimido end group: 7.86–7.96 ppm (m, 2 mol %) and 124, 132, 135 and 167 ppm. Within the measurement accuracy, all the end groups are present in the form of the phthalimide. The kneading test at 340° C. showed no decomposition of the melt after 30 minutes.

EXAMPLE 18a

Polyether amide using $NH_3$ gas as a neutralizing agent

Example 11 was repeated, with the difference that $NH_3$ gas was passed into the solution 30 minutes after BCl had been added, and 50 ml of glacial acetic acid were added after a further 30 minutes in order to buffer the $NH_3$ excess. The $NH_4Cl$ which had precipitated was filtered off and the product was worked up—as already described in Example 8.

Staudinger index: $[\eta]_o$ 0.96 dl/g
GPC: $M_n$ (GPC)=53,000 g/mol; D=2.1
Ash content: 156 ppm.

EXAMPLE 18b

Polyether amides using water as the HCl-binding agent

Example 11 was repeated, but no neutralizing agent was added, and the hydrochloric acid polymer solution was directly added dropwise to E water from a glass dropping funnel. The water thus served not only to precipitate the polymer but also to bind the resulting HCl as aqueous dilute hydrochloric acid. After working up as in Example 8, an ash content of 30 ppm was determined.

EXAMPLE 18c

The following data were measured on 8 samples of the terephthalamide of 2,2-bis[4-(4-aminophenoxy)phenyl]propane prepared according to the abovementioned examples:

| $[\eta]_o$/dl/g | $M_w$/d/mol[a] | $M_w$(PS)/g/mol[b] | $\eta_m$/Pa.s[c] |
|---|---|---|---|
| 0.64 | 23,000 | 73,000 | 2,000 |
| 0.82 | 33,000 | 64,000 | 3,000 |
| 0.96 | 42,000 | 95,000 | 8,000 |
| 1.08 | 50,000 | 127,000 | 20,000 |
| 1.65 | 82,000 | — | — |
| 2.00 | 130,000 | — | 500,000 |
| 2.25 | 143,000 | — | — |
| 2.61 | 185,000 | — | about $10^6$ |

[a] Light scattering measurement gives the absolute molecular weight
[b] GPC measurement gives the molecular weight in relation to polystyrene
[c] Zero shear viscosity in the melt at 340° C.

Figure 3:
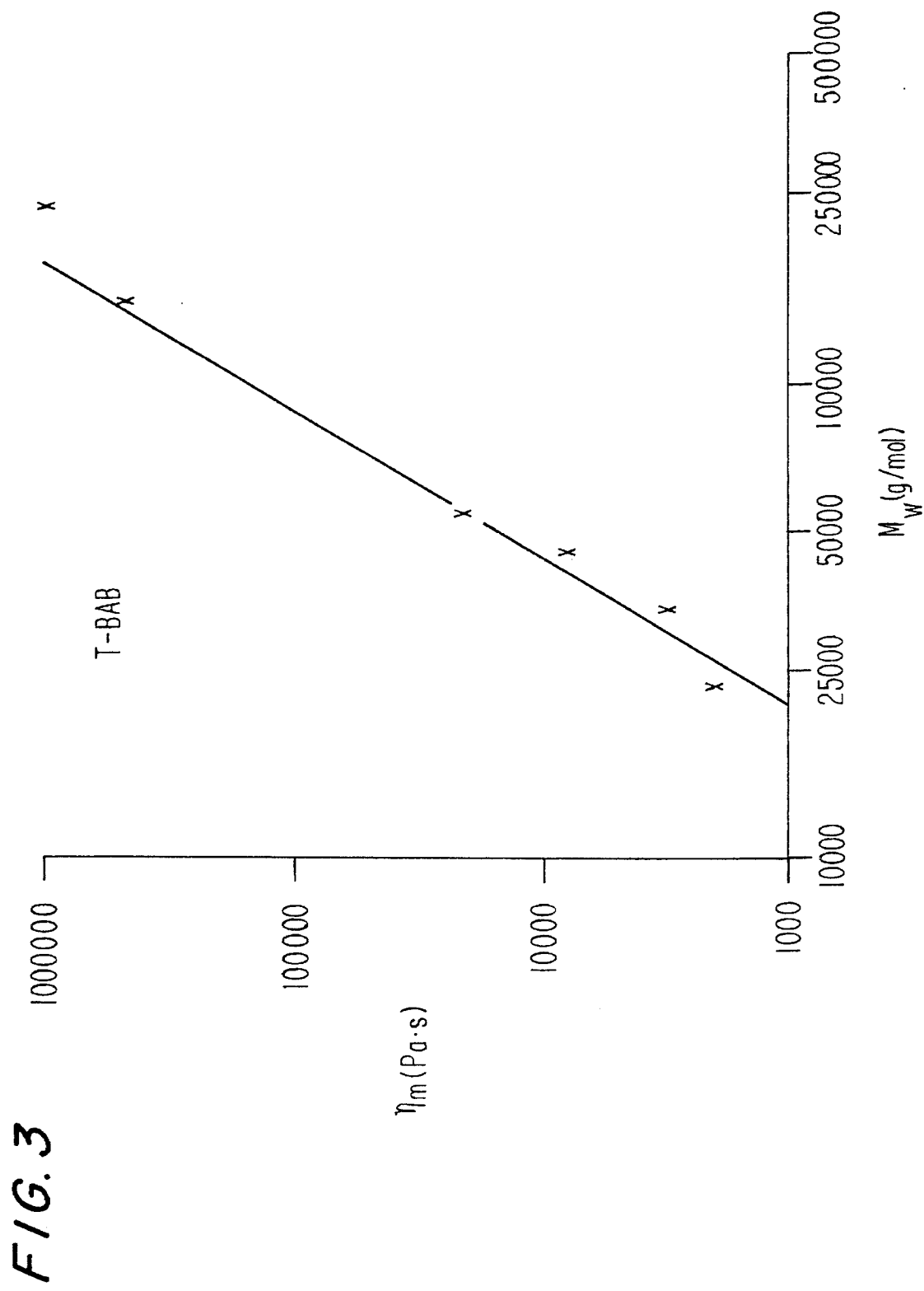
FIG. 3 is a graph of zero shear melt viscosity versus molecular weight.

By plotting the zero shear melt viscosity at 340° C. on a graph against the molecular weight (FIG. 3), it can immediately be seen that polymers of $M_w > 80,000$, i.e. $M_n > 20,000$–40,000, depending on the inhomogeneity, corresponding to $[\eta]_o > 1.5$ dl/g do not give compositions which can be shaped by normal injection molding. In particular, below about $[\eta]_o$ 1.1 dl/g ($M_w = 50,000$), polymers having melt viscosities of less than 10,000 Pa.s which can be processed by injection molding without major processing problems are obtained.

EXAMPLE 19

Copolymer with a second diamine

Figure 4:
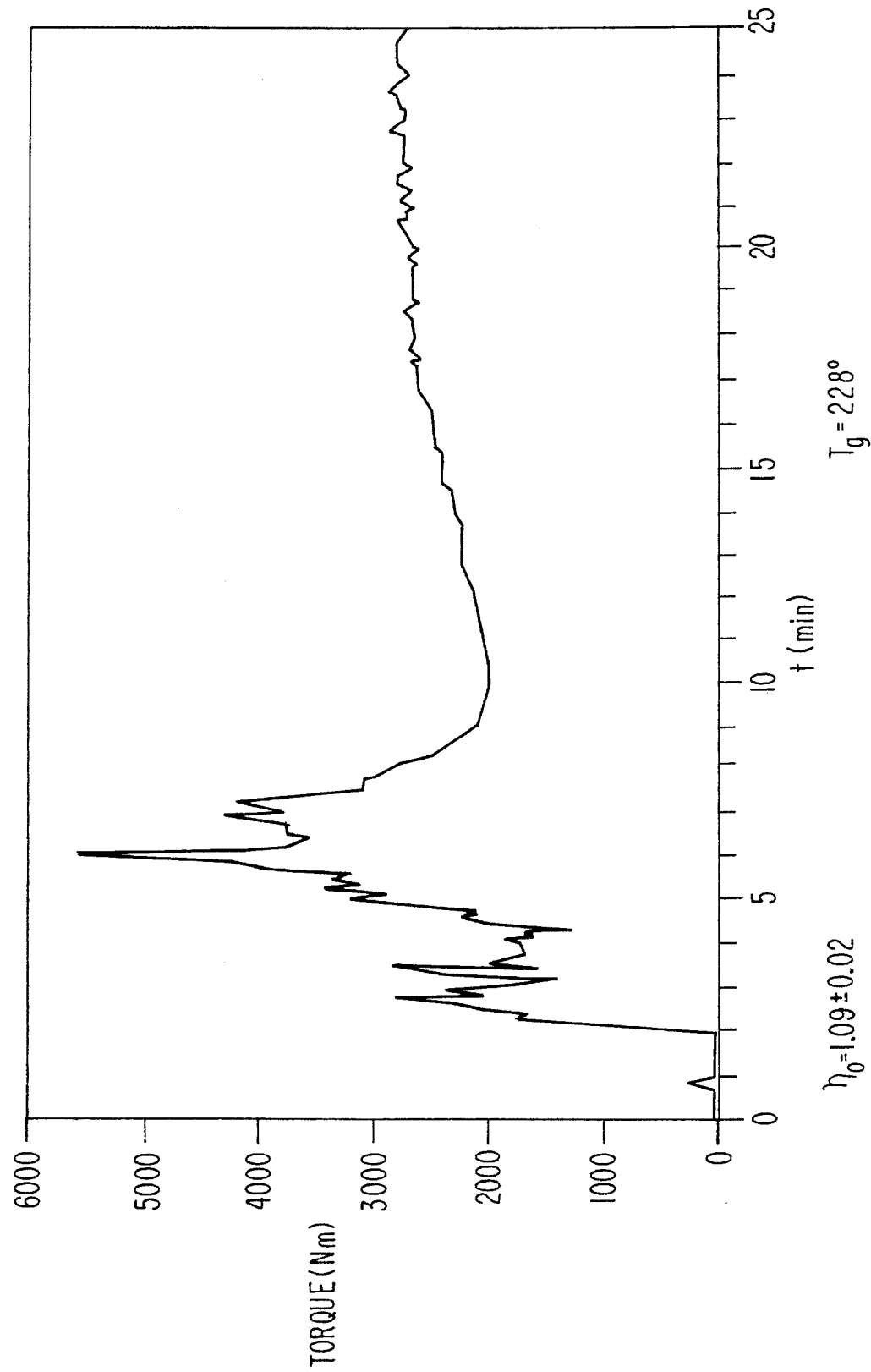
FIG. 4 is a graph of torque versus time for a copolymer according to the invention.

Example 8 was repeated; however, 20 mol % of the BAB were replaced by 4,4'-diamino-3,3'-dimethylbiphenyl and FBC was replaced by BCl. The polymer, which was worked up and dried as in Example 8, had a glass transition temperature (DSC) $T_g$ of 228° C. Staudinger index: $[\eta]_o = 1.09$ dl/g, which corresponds to $M_w = 51,000$ g/mol. GPC: $M_n = 66,000$ g/mol; D=2.1. Homogeneous pressed sheets were obtained at 320° C. under a pressure of initially 10 bar (10 minutes) and 210 bar (5 minutes). Thereafter, 60 g of the powder were investigated in a measurement kneader under argon at 340° C. for 25 minutes at 100 revolutions per minute. The measurement curve plotted (FIG. 4) initially shows variations in the torque which originate from the filling operation. The rise to the maximum value corresponds to the plasticizing operation, and the curve finally becomes a practically constant plateau. This corresponds to a complete, stable melt. The massive polymer pieces obtained after this treatment are almost completely soluble in NMP, but do not change in methylene chloride.

EXAMPLES 20–25

Aramides were prepared from BAB and 2,5-furandicarbonyl dichloride, as one of the acid components, in accordance with the abovementioned examples.

| Ex. | % of FDC | % of IPC | % of TPC | Molar ratio q/% | BCl/% | Neutralizing agent |
|---|---|---|---|---|---|---|
| 20 | 50 | — | 50 | 97 | 6 | PO |
| 21 | 100 | — | — | 94.5 | 12 | CaO |
| 22 | 50 | — | 50 | 97 | 8.8 | CaO |
| 23 | 100 | — | — | 97 | 6 | CaO |
| 24 | 100 | — | — | 95 | 10 | CaO |
| 25 | 20 | 20 | 60 | 96.5 | 8 | CaO |

Transparent sheets could be pressed from the polymer powders of Examples 20–25 at 340° C. without problems. In DSC, Example 20 shows a glass stage at 230° C. and no (re)crystallization, i.e. mainly amorphous polymers are present.

The polymer powders from Example 21 and Example 23 were extruded under the conditions described in Example 1. Extrusion at 40 and 80 revolutions per minute was carried out without problems, although melt fracture initially occurred in Example 23. Smooth, brown and transparent strands, which could be processed to granules after cooling in water, were obtained.

EXAMPLE 26

Polyether amide from 2,6-naphthalenedicarbonyl dichloride (NDC) and BAB 410.5 g (1.0 mol) of BAB were dissolved in 2051 g of dry NMP under nitrogen. 244.3 g (0.965 mol) of NDC were added at 5° C. The internal temperature initially rose to 35° C.; the mixture was then heated to 70° C. 60 minutes later, 11.8 g (0.084 mol) of BCl were added and, after a further 30 minutes, 62 g (1.1 mol) of CaO were added as a suspension in 33 g of NMP. The mixture was subsequently stirred for 90 minutes and worked up as in Example 8.

The analytical results are summarized in the following table.

EXAMPLES 27–31

Copolyether amides from NDC and other diacid chlorides

Analogous to Example 26, but the BAB was initially introduced into 1200 g of NMP and the homogeneous solution of the acid chlorides shown in the following table in 763 g of NMP was added. The resulting polymer samples were pressed to sheets in vacuo (340° C.: heating up for 10 minutes, pressing pressure of 100 bar for 2 minutes). The yellowish sheets, which are free from gas bubbles, are mechanically stable and show flow traces which suggest good processability of the melt.

of 100 bar. DSC analysis gives a glass transition temperature $T_g$ of 258° C. (amorphous). The pressed sheet shows the same properties, from which a good melt stability of the polymer may be concluded.

Comparison Example E demonstrates that polymers of the same empirical composition as Examples 3–7 of this application prepared by interface condensation and therefore without a molecular weight control and efficient end group blocking lead to a material which is not thermoplastically processable.

Comparison Example E

Equimolar ratio of acid to amine component, interface condensation, variation of the TPC/IPC ratio.

A solution of 76.30 g (1.907 mol) of NaOH and 0.82 g (7.5 mmol) of hypophosphorous acid in 800 g of ice was mixed thoroughly with a solution of 328.4 g (0.8 mol) of BAB in 1.2 kg of dry cyclohexanone in a Warring blender. A solution of 182.41 g (0.8 mol) of the particular mixture of TPC and IPC in 1.2 kg of cyclohexanone were added to this mixture with vigorous mixing, and rinsing was carried out with 100 g of cyclohexanone. The mixture was cooled externally with ice-water, while stirring further, in order to keep the temperature at 2°–5° C. After 3 hours, 6.0 g (0.043 mol) of benzoyl chloride, dissolved in 100 g of cyclohexanone, were introduced and the mixture was heated to room temperature in the course of about 1 hour. After a further 2 hours at room temperature, the pasty mass was treated with about twice the volume of methanol and the polymer powder precipitated out in this way was worked up further as described in Example 1, careful attention being paid to complete removal of the residual cyclohexanone under an oil pump vacuum—finally at 200° C.

| Ex. | % of NDC | % of TPC | % of IPC | % of FDC | $[\eta]_o/dl \cdot g^{-1}$ | GPC evaluation $M_n$ (PS standard) | D | DSC $T_g{}^{a)}$ | $T_g{}^{b)}$ |
|---|---|---|---|---|---|---|---|---|---|
| 26 | 100 | 0 | 0 | 0 | 1.13 ± 0.01 | 43,000 | 2.9 | 229 | 228[c] |
| 27 | 50 | 50 | 0 | 0 | 0.83 ± 0.01 | 35,000 | 2.4 | 226 | 225 |
| 28 | 50 | 0 | 50 | 0 | 0.85 ± 0.05 | 31,000 | 2.7 | 226 | 226[d] |
| 29 | 70 | 0 | 30 | 0 | 0.89 ± 0.01 | 42,000 | 2.3 | 228 | 228 |
| 30 | 70 | 0 | 0 | 30 | 0.80 ± 0.03 | 41,000 | 2.3 | 227 | 228 |
| 31 | 33⅓ | 0 | 33⅓ | 33⅓ | 0.83 ± 0.05 | 38,000 | 2.2 | 223 | 227 |

[a] Glass transition temperature of the polymer powder
[b] Glass transition temperature of the pressed sheet (vacuum, 340° C., 15 minutes: 0 bar; 5': 100 bar)
[c] Additionally a weak melting peak at 350° C. (1.1 J/g)
[d] Additionally a weak melting peak at 335° C. (0.5 J/g)

EXAMPLE 32

Copolyether amide from TPC, BAB and 2,2-bis(4-aminophenyl)propane (PBA)

Analogously to Example 26, but 246.3 g (0.6 mol) of BAB were initially introduced into 2030 g of NMP with 135.6 g (0.6 mol) of PBA, and polycondensation was carried out with 235.1 g (1.158 mol=96.5%) of TPC. Finally, 14.2 g (0.11 mol) of BCl, and lastly 74 g (1.3 mol) of CaO, suspended in 40 g of NMP, were added. After working up as described in Example 8, the following values were measured:

Staudinger index: $[\eta]_o = 0.82 \pm 0.01$ dl/g

GPC: $M_n$ (PS): $M_n = 35,000$ g/mol; D=2.2.

The polymer powder could be pressed in vacuo to give a translucent, flexible sheet (340° C.): heating up time 10 minutes, pressing time 2 minutes under a pressing pressure The following analytical data were determined on the polymers thus prepared, which are not according to the invention:

| Comparison Example | TPC/IPC | $[\eta]_o$ dl/g | $M_n$ | GPC D |
|---|---|---|---|---|
| E-3 | 2/8 | 3.8 | 236,000 | 14 |
| E-4 | 3/7 | 1.9 | 88,000 | 4.4 |
| E-5 | 4/6 | 2.5 | 99,000 | 4.3 |
| E-6 | 5/5 | 2.1 | 89,000 | 4.0 |

All four polymer samples resulted in dark brown to black, crumbly materials, which were evidently decomposed, without signs of a melt, within 4–10 minutes in a kneading test under an argon inert gas atmosphere (60 g, 340° C.). More extensive thermoplastic processing, for example extrusion, was not possible under these circumstances.

General comments on the analysis of the polymers:

Kneaders can be employed to characterize the polymers, especially the melt viscosity and the stability of the melt with respect to time (kneader/measurement extruder: HAAKE Rheocord System 90 with a kneading chamber at 400° C. and a twin-screw extruder TW 100). The torque of the kneader is usually plotted against time. The shape of the curve allows conclusions on the stability of the melt to be drawn.

Absolute measurement of the melt viscosity can be carried out in commercially obtainable viscometers, for example capillary viscometers or plate/plate viscometers (Göttfert materials testing machine, melt index tester, model MPS-D; Rheometrics Dynamic Spectrometer System 4 with plate/plate geometry, $N_2$). In addition to the important information on the dependence of the melt viscosity on the shear rate, these measurements also allow evaluation of the stability of the melt.

Use Examples

A. Metal coating from a solution of the polyether aramide

The polycondensation solution from Example 8 was applied to in each case 3 wires of copper or high-grade steel which had first been degreased with NMP. After drying under about 200 mbar (120° C.) for 16 hours and then under <10 mbar for 8 hours, a clear coating film was obtained, this film retaining its scratch resistance and flexural strength even after storage in boiling water for 4 hours and subsequent storage in acetone at room temperature for 4 hours.

B. Metal coating from a powder of the polyether aramide

The polymer powder from Example 5 was applied to a sheet of copper which had first been cleaned with NMP, and was stoved in a preheated vacuum drying cabinet under 0.5 mbar at 370° C. in the course of 5 hours. Even after boiling with water and subsequent treatment with acetone, the outstanding adhesive strength and scratch resistance of the coating was retained.

We claim:

1. A thermoplastically processable aromatic polyether amide of the formula (I)

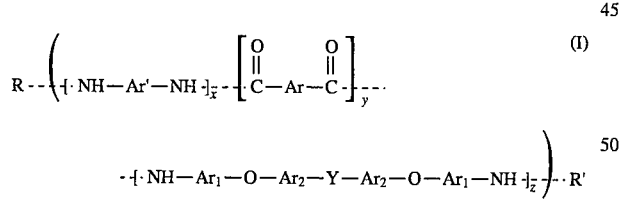

in which the symbols Ar, Ar', $Ar_1$, $Ar_2$, R, R', Y, x, y and z have the following meanings:

Ar is a divalent, substituted or unsubstituted, aromatic or heteroaromatic radical or a group —Ar*—Q—Ar*— in which

Q is a bond or Q represents an —O—, —C(CH$_3$)$_2$—, —CO—, —S—, —SO— or —SO$_2$— bridge and Ar* is at least one aromatic radical; the carbonyl groups attached to the Ar radical are on non-adjacent ring carbon atoms optionally substituted by one or two branched or unbranched $C_1$–$C_3$-alkyl or alkoxy radicals, aryl or aryloxy radicals, $C_1$–$C_6$-perfluoroalkyl or perfluoroalkoxy radicals or by fluorine, chlorine, bromine or iodine atoms, and Ar is one to three different radicals, Ar and Ar' are identical or different and independent of one another and Ar' is the same as Ar or is an Ar—Z—Ar group, in which Z is a —C(CH$_3$)$_2$— or —O—Ar*—O—bridge;

$Ar_1$ and $Ar_2$ are identical or different from one another and are in each case a substituted or unsubstituted para- or meta-arylene radical, Y being a —C(CH$_3$)$_2$—, —CO—, —SO$_2$—, —S— or a —C(CF$_3$)$_2$—bridge, wherein a) the sum of the mole fractions x, y and z is one, the sum of x and z is not equal to y, and x can be the value zero, b) the ends of the polymer chain are blocked completely by monofunctional groups R and R' which do not react further in the polymer, R and R' being independent of one another and identical or different, and are selected from the group consisting of the formulae V, VI, VII and VIII

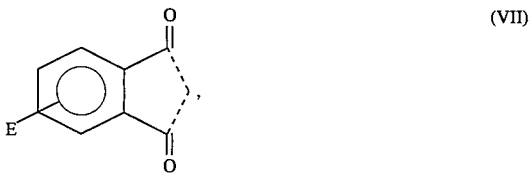

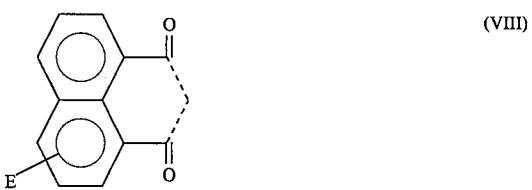

wherein, in the case of end groups VII and/or VIII, the terminal nitrogen in formula (I) is an imide nitrogen, and wherein E is a hydrogen or a halogen atom, or an organic radical, c) the polyether amide has a number average molecular weight $M_n$ in the range from 5,000 to 50,000 ($M_n$ is absolute number average), d) the molar ratio q (acid component to diamine component) for preparation of the polyether amides of formula I is in the range from 0.90 to 0.98 and 1.02 to 1.10, exact stoichiometry (q is 1) of the bifunctional components being excluded, and e) the melt viscosity of the polyether amides at the processing temperature does not exceed 10,000 Pascal.s.

2. An aromatic polyether amide as claimed in claim 1, which has a Staudinger index in the range from 0.4 to 1.5 dl/g in N-methyl-pyrrolidone at 25° C.

3. An aromatic polyether amide as claimed in claim 1, wherein inorganic impurities in the polymer after purification is less than 1000 ppm.

4. An aromatic polyether amide as claimed in claim 1, wherein the acid component

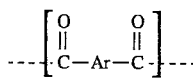

is derived from an acid selected from the group consisting of furandicarboxylic acid, terephthalic acid and isophthalic acid.

5. An aromatic polyether amide as claimed in claim 1, in which Ar, Ar', $Ar_1$, $Ar_2$ and Y in each case is one to three different radicals.

6. A process for the preparation of a thermoplastically processable aromatic polyether amide as claimed in claim 1, which comprises reacting in a polycondensation one or more dicarboxylic acid derivatives of the formula (VIII)

$$W—CO—Ar—CO—W \qquad (VIII)$$

in which W is a fluorine, chlorine, bromine or iodine atom, or an —OH or OR" group, in which R" is a branched or unbranched aliphatic or aromatic radical with at least one diamine, a chain-blocking agent being added after the end of polycondensation in a stoichiometric amount or more than the stoichiometric amount of diamine.

7. The process as claimed in claim 6, wherein a monofunctional, optionally substituted acid halide or acid anhydride is added as the chain-blocking agent.

8. The process as claimed in claim 6, wherein a monofunctional, amine is added as the chain-blocking agent.

9. The process as claimed in claim 6, wherein the chain-blocking agent is added in at least the stoichiometric amount.

10. An aromatic polyether amide as claimed in claim 1, wherein the aromatic polyether amide comprises units of furandicarboxylic acid.

11. An aromatic polyether amide as claimed in claim 1, wherein in each case one to three different radicals of the formula —CO—Ar—CO—, —NH—Ar'—NH— or —NH—$Ar_1$—O—$Ar_2$—Y—$Ar_2$—O—$Ar_1$—NH— are employed.

12. The process as claimed in claim 6, wherein the polycondensation is carried out in an aprotic polar solvent at a temperature in the range from −20° to +120° C.

13. The process as claimed in claim 6, wherein, after conclusion of the reaction, 2 to 40 by weight of polycondensate are present in solution.

14. The process as claimed in claim 6, wherein the dicarboxylic acid derivatives and the diamines are reacted by a solution process.

15. The process as claimed in claim 6, wherein the dicarboxylic acid derivatives and the diamines are reacted by a precipitation process.

16. The process as claimed in claim 6, wherein the dicarboxylic acid derivatives and the diamines are reacted by a melt condensation process.

17. A shaped article of the polyether amide of claim 1.

18. An aromatic polyether amide as claimed in claim 11, which contains units selected from the group consisting of 2,2-bis[4-(4-aminophenoxy)-phenyl]propane and bis[4-(4-aminophenoxy)phenyl]sulfone.

19. The process as claimed in claim 7, wherein the acid halide or acid anhydride is aromatic.

20. The process as claimed in claim 8, wherein the amine is aromatic.

* * * * *